(12) United States Patent
Kessler et al.

(10) Patent No.: US 6,434,291 B1
(45) Date of Patent: Aug. 13, 2002

(54) MEMS-BASED OPTICAL BENCH

(75) Inventors: William J. Kessler, Groton; Michael B. Frish, Andover, both of MA (US); Steven J. Davis, Londonderry, NH (US); Philip Keating, Salem, MA (US)

(73) Assignee: Confluent Photonics Corporations, Andover, MA (US)

( * ) Notice: Subject to any disclaimer, the term of this patent is extended or adjusted under 35 U.S.C. 154(b) by 46 days.

(21) Appl. No.: 09/633,934

(22) Filed: Aug. 8, 2000

Related U.S. Application Data (60) Provisional application No. 60/200,189, filed on Apr. 28, 2000.

(51) Int. Cl.[7] ................................................. G02B 6/28
(52) U.S. Cl. ............................. 385/24; 385/16; 385/33; 359/131
(58) Field of Search ............................... 385/24, 31, 33, 385/37, 27, 15, 28, 16, 18; 359/124, 128, 125, 133, 131

(56) References Cited

U.S. PATENT DOCUMENTS

| | | | |
|---|---|---|---|
| 4,859,017 A | 8/1989 | Brierley et al. | 350/96.15 |
| 5,428,697 A * | 6/1995 | Dolfi et al. | 385/24 |
| 5,500,761 A | 3/1996 | Goossen et al. | 359/290 |
| 5,524,012 A | 6/1996 | Wang et al. | 372/23 |
| 5,589,974 A | 12/1996 | Goossen et al. | 359/290 |
| 5,636,052 A | 6/1997 | Arney et al. | 359/291 |
| 5,640,479 A | 6/1997 | Hegg et al. | 385/120 |
| 5,659,418 A | 8/1997 | Yurke | 359/290 |
| 5,684,631 A | 11/1997 | Greywall | 359/565 |
| 5,751,469 A | 5/1998 | Arney et al. | 359/291 |
| 5,774,604 A | 6/1998 | McDonald | 385/18 |
| 5,777,763 A | 7/1998 | Tomlinson, III | 359/130 |
| 5,786,925 A | 7/1998 | Goossen et al. | 359/245 |
| 5,825,528 A | 10/1998 | Goossen | 359/291 |
| 5,838,847 A | 11/1998 | Pan et al. | 385/18 |
| 5,872,880 A | 2/1999 | Maynard | 385/88 |
| 5,887,090 A | 3/1999 | Rudolph et al. | 385/24 |
| 5,936,752 A | 8/1999 | Bishop et al. | 359/124 |
| 5,960,132 A | 9/1999 | Lin | 385/18 |
| 5,960,133 A | 9/1999 | Tomlinson | 385/18 |
| 5,963,350 A | 10/1999 | Hill | 359/127 |
| 6,002,513 A | 12/1999 | Goossen et al. | 359/291 |
| 6,011,884 A | 1/2000 | Dueck et al. | 385/24 |
| 6,011,885 A | 1/2000 | Dempewolf et al. | 385/34 |
| 6,031,946 A | 2/2000 | Bergmann et al. | 385/18 |

FOREIGN PATENT DOCUMENTS

| | | |
|---|---|---|
| WO | 99/31532 | 6/1999 |

* cited by examiner

*Primary Examiner*—Phan T. H. Palmer
(74) *Attorney, Agent, or Firm*—Testa, Hurwitz & Thibeault, LLP

(57) ABSTRACT

An optical bench that provides a core component for a communication system that performs all of the necessary switching, adding, dropping, and manipulating of optical signals entirely in the optical domain. The optical bench comprises a dispersive optical element and a spatial light modulator. Various devices that are useful in the field of optical communication can be produced using the optical bench apparatus as a core component, with the addition of other components to the optical bench. Exemplary optical communication devices that can be built using the optical bench include optical add/drop multiplexers (OADM), Dense Wavelength Division Multiplexing (DWDM) routers, tunable filters, tunable laser sources, optical cross connects, and the like.

28 Claims, 6 Drawing Sheets

MEMS-BASED OPTICAL BENCH

CROSS-REFERENCE TO RELATED APPLICATIONS

This application claims the benefit of U.S. Provisional Patent Application Serial No. 60/200,189, filed Apr. 28, 2000, which application is incorporated herein in its entirety by reference.

FIELD OF THE INVENTION

This invention relates generally to optical communication systems and components. More particularly, the invention relates to optical systems comprising microelectromechanical (MEMS) components.

BACKGROUND OF THE INVENTION

In the field of telecommunication, it is recognized that optical communication components and systems that use light waves to carry information, employing such components as infrared solid state lasers and the like, and fiber optic cables and similar communication media, offer many considerable advantages over conventional copper wire-based communication systems that communicate using electrical signals to carry information. One advantage has to do with the greater amount of information that can be carried by a single physical connection using a single fiber optic strand as compared to a copper wire circuit.

At present, however, there exists no simple, convenient and cost effect technology for directing, switching, adding, removing, and otherwise manipulating information carried by optical signals that flow through fiber optic strands, or cables comprising a plurality of such strands, in the form of light. A very much simplified description of the present situation in the field of optical communication illustrates the need for appreciable improvements in optical communication components.

If a simple two station direct voice telecommunication link using optical technology existed, it would operate by converting vocal information input at the first station into electrical signals, converting the electrical signals to optical signals, and transmitting the optical signals via a fiber optic strand from the transmitter station to a receiver station. The receiver station would accept the optical signals, the optical signals would be converted into electrical signals, and the electrical signals would be converted into information in a form, such as sound, that a party holding the handset of the receiving station can sense.

However, in a real telephone network using commercial state of the art optical communication technology, involving a station that can call any of a plurality of other stations, it becomes necessary to switch signals for routing purposes. The electrical signals that are generated at the first receiving station (which is now a central office) are switched in the same manner as are the standard electrical signals carried by copper wire communication circuits, and are then reconverted to optical signals. The optical signal is sent along a fiber optic strand, possibly to one or more intermediate stations, where the conversion and reconversion process occurs again, until the signal finally reaches its destination. It would be advantageous to be able to do all of the signal switching and manipulation without having to repeatedly convert optical to electrical signals and electrical signals to optical signals. In particular, it would be useful if such signal switching and manipulation could be accomplished simply, conveniently and in a cost effect manner.

SUMMARY OF THE INVENTION

The optical bench of the present invention provides solutions that eliminate the limitations and deficiencies previously described. The optical bench provides a core component that makes possible the capability of performing all of the necessary switching, adding, dropping, and manipulating of optical signals entirely in the optical domain, without having to convert any signal to an electrical signal from an optical signal, or the reverse. The optical bench can have, among different embodiments, monolithic structures that are fabricated conveniently by the methods of micromachining from single substrates, such as silicon wafers and the like.

Micromachining of silicon, as an example, allows manufacturing with good yield, in a technology that employs well developed fabrication methods on a material that is relatively inexpensive and is readily obtained. Furthermore, the structures so produced are all part of, or are connected to, a single wafer of a solid material, and are therefore likely to maintain alignment under the stresses of thermal changes, mechanical shocks, and the like. To the extent that the optical bench core structure is made of a well understood semiconductor material, it is also possible to build control circuitry directly into the semiconductor wafer, further simplifying the interconnection of the optical bench with external control circuitry such as computers and the like.

In one aspect, the invention features an optical apparatus that includes a wavelength dispersive optical element receiving a substantially collimated input signal having multiple wavelengths and providing a wavelength dispersed output signal, and a spatial modulator element receiving the wavelength dispersed output signal and providing an output signal comprising at least a portion of each dispersed wavelength.

In one embodiment, the optical apparatus further includes a second wavelength dispersive optical element receiving the output signal provided by the spatial modulator and providing a substantially collimated output signal. The substantially collimated output signal can be directed in substantially the same direction as that of the substantially collimated input signal.

The optical apparatus can additionally include an absorbing surface that absorbs selected dispersed wavelengths of the spatial modulator output signal, the spatial modulator controlling selection of the wavelengths. The selection of the dispersed wavelengths to be absorbed can be controlled dynamically by the spatial modulator. In addition, the optical apparatus can include a variable reflection filter. Alternatively, the optical apparatus can include a variable transmission filter.

In another aspect, the invention features an optical apparatus that includes a wavelength dispersive optical element receiving a substantially collimated input signal propagating in a first direction, the input signal having multiple wavelengths, and providing a wavelength dispersed output signal, a spatial modulator element receiving the wavelength dispersed output signal and providing an output signal comprising at least a portion of each dispersed wavelength, and the wavelength dispersive optical element receiving the output signal provided by the spatial modulator and providing a substantially collimated output signal propagating in a second direction. In one embodiment, the second direction of propagation is substantially opposite to the first direction of propagation.

In still another aspect, the invention features an optical apparatus that includes a wavelength dispersive optical element receiving a substantially collimated input signal propagating in a first direction, the input signal having multiple wavelengths, and providing a first wavelength dispersed output signal and a second wavelength dispersed output signal, a spatial modulator element receiving the first wavelength dispersed output signal and the second wavelength dispersed output signal and providing a transmitted output signal and a reflected signal, and a collimating optical element receiving the reflected signal and providing a substantially collimated output signal propagating in a second direction substantially opposite to the first direction.

In one embodiment, the wavelength dispersive optical element and the collimating optical element are the same optical structure viewed from opposite ends thereof. In another embodiment, one of the transmitted output signal and the reflected signal comprises a signal modulated to have substantially zero intensity.

In a further aspect, the invention features a monolithic optical apparatus that includes a wavelength dispersive optical element receiving a substantially collimated input signal having multiple wavelengths and providing a wavelength dispersed output signal, and a spatial modulator element receiving the wavelength dispersed output signal and providing an output signal comprising at least a portion of each dispersed wavelength, wherein the wavelength dispersive optical element and the spatial modulator element are provided on a single substrate.

In yet another aspect, the invention features a microelectromechanical optical apparatus that includes a wavelength dispersive optical element receiving a substantially collimated input signal having multiple wavelengths and providing a wavelength dispersed output signal, and a spatial modulator element receiving the wavelength dispersed output signal and providing an output signal comprising at least a portion of each dispersed wavelength.

The wavelength dispersive optical element and the spatial modulator element can be provided on a single substrate. In one embodiment, the single substrate comprises a single crystal. In another embodiment, the single substrate comprises a semiconductor single crystal. In yet another embodiment, the single substrate comprises polycrystalline material.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

The optical platform of the present invention, as well as products incorporating the platform, is based upon the combination of wavelength selective and switching elements. The combination of gratings, interferometers and switches results in integrated Dense Wavelength Division Multiplexing (DWDM) switching capabilities for filters, optical add/drop multiplexers (OADM), and DWDM routers and cross connects. The addition of an active element, such as an Erbium-doped fiber amplifier (EDFA) or laser diode chip, results in a tunable, multi-frequency laser source which reduces DWDM system complexity and could impact DWDM system cost. The optical bench component can be thought of as an optical toolbox filled with optical element designs which can be quickly and easily combined with other elements to create flexible optical structures. The structures could be customized to specific optical telecom architectures in a cost-effective manner, providing the precise functionality required at minimal cost. In the following paragraphs we describe the primary optical element which provides the basic building block for each of the exemplary product structures subsequently detailed.

Figure 1:
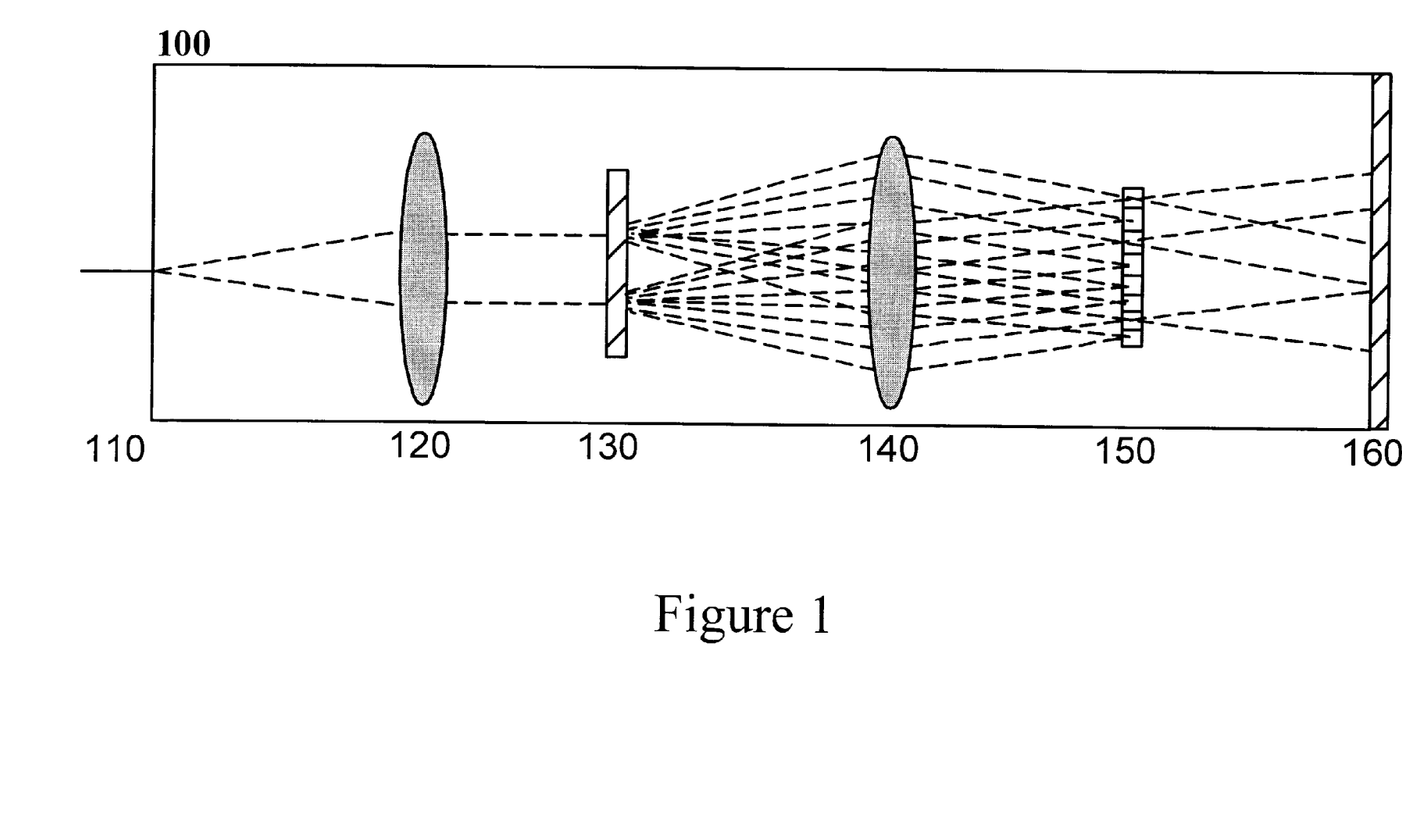
FIG. 1 shows as an exemplary embodiment of the invention a primary optical bench component consisting of a dispersive optical element and a spatial light modulator, which component may be embodied in products such as tunable filters and optical add/drop multiplexers (OADMs).

FIG. 1 shows a schematic 100 of the primary optical component. The multiple wavelengths input from an optical fiber 110 are captured and collimated by a lens structure 120 (consisting of one or more lenses). The collimated, multi-wavelength laser beam is transmitted to a dispersive optical element 130. This may consist of a transmissive or reflective holographic grating (or other element such as a series of prisms) which spatially separates the multiple wavelengths of incident radiation. An additional lens (140) focuses the individual wavelengths of light upon a spatial light modulator (SLM) 150. In this configuration, the grating may be a reflective concave grating or the focusing function may be performed by another distinct optical component such as a lens or mirror. The SLM 150 serves the function of selecting the dispersed wavelengths of interest for either reflection or transmission. In reflection mode the SLM element 150 rotor-reflects the incident wavelength back to the DOE 130 and subsequently the lens 120 and the optical fiber 110. In transmission mode the SLM 150 passes the incident wavelength and it is absorbed on the back surface 160 of the package. Operating in this manner, the optical bench can act as a filter, either passing or rejecting a series of wavelengths. It also acts as a wavelength drop module without recovery of the dropped frequency (as shown in FIG. 1).

This basic optical component enables an optical filter multiplexer analogous to an arrayed waveguide grating (AWG), which can be a geometric selection filter. The multiplexer is also a geometric selection filter, but it also allows dynamic on/off switching of individual wavelengths.

Geometric wavelength selection filters provide precise predetermined multiplexing of transmission wavelengths without the use of analog control signals. The filter will combine this approach with a variable reflection/transmission filter to enhance the basic functionality using an integrated component structure. There are currently no integrated components, which provide this level of functionality.

FIG. 1 displays individual International Telecommunication Union (ITU) standard frequencies illuminating a single SLM element 150. The spatial dispersion of the grating, when combined with attainable SLM element separation provides a frequency resolution of approximately 5 to 20 GHz. The typical spectral bandwidth of a telecommunications grade distributed feedback (DFB) diode laser is <50 MHz, and the uncertainty in the ITU grid frequencies is 10% of the grid spacing, which is currently 100 GHz. As the ITU grid spacing is reduced to 50 GHz, the grid frequency uncertainty is reduced to 5 GHz. The proposed structure will still be applicable to the decreased grid frequency separation utilizing a 10 GHz grating resolution. This resolution ensures that the <50 MHz wide laser bandwidth with an unknown central frequency of 5 GHz, will always underfill an individual SLM array element. The single SLM element 150 illumination structure provides a binary decision as to whether a wavelength is maintained or dropped depending on the on/off (reflective/transmissive) state of the "mirror". The SLM elements 150 can be sequentially turned on and off (reflective and transmissive) functioning as single or multiple frequency tunable filters.

The SLM 150 can be implemented using a number of different optical element structures. Some of these structures include coated mirrors, tunable fiber Bragg gratings, thermoelectric switches, acousto-optic switches, electrically modulated lithium niobate elements, and the like. The basic functionality is a bi-static mirror. An additional structure, which provides not only bistatic mirror functionality, but also variable reflection/transmission and additional spectral resolving power, is a Fabry-Perot interferometer array (FPIA). A micro FPIA provides an additional layer of fine wavelength reflection/transmission control to the geometric control provided by the primary optical element. For example, in the embodiment presented above where an ITU grid frequency illuminates a single SLM element 150, the micro FPIA element may be controlled to transmit 50% of the incident light by changing the FPI cavity Q (via mirror separation). Operated in this manner, only one-half of the incident ITU wavelength intensity is returned to the optical fiber. The FPI mirror separation may also be used to sweep the transmission/reflection curve across the ITU frequency, acting as a continuously variable frequency filter within an individual SLM element 150. This variable filter structure can be used to implement an erbium doped fiber amplifier (EDFA) gain flattening filter product line as additional embodiments. Note that it is likely that the FPI spectral bandwidth will always be broader than the narrow diode laser spectral bandwidth.

As illustrated by this set of exemplary embodiments, a range of functions may be performed by the combination of a dispersive optical element (DOE) 130 coupled to an SLM 150 comprising an array of Fabry Perot interferometers (FPI). The proposed use of the FPIA in combination with the DOE structure 130 will reduce the potential for channel crosstalk while providing low insertion loss. In some embodiments, low insertion loss may obviate the need for an EDFA, further reducing the potential for crosstalk and resulting in a significant cost savings.

Figure 2:
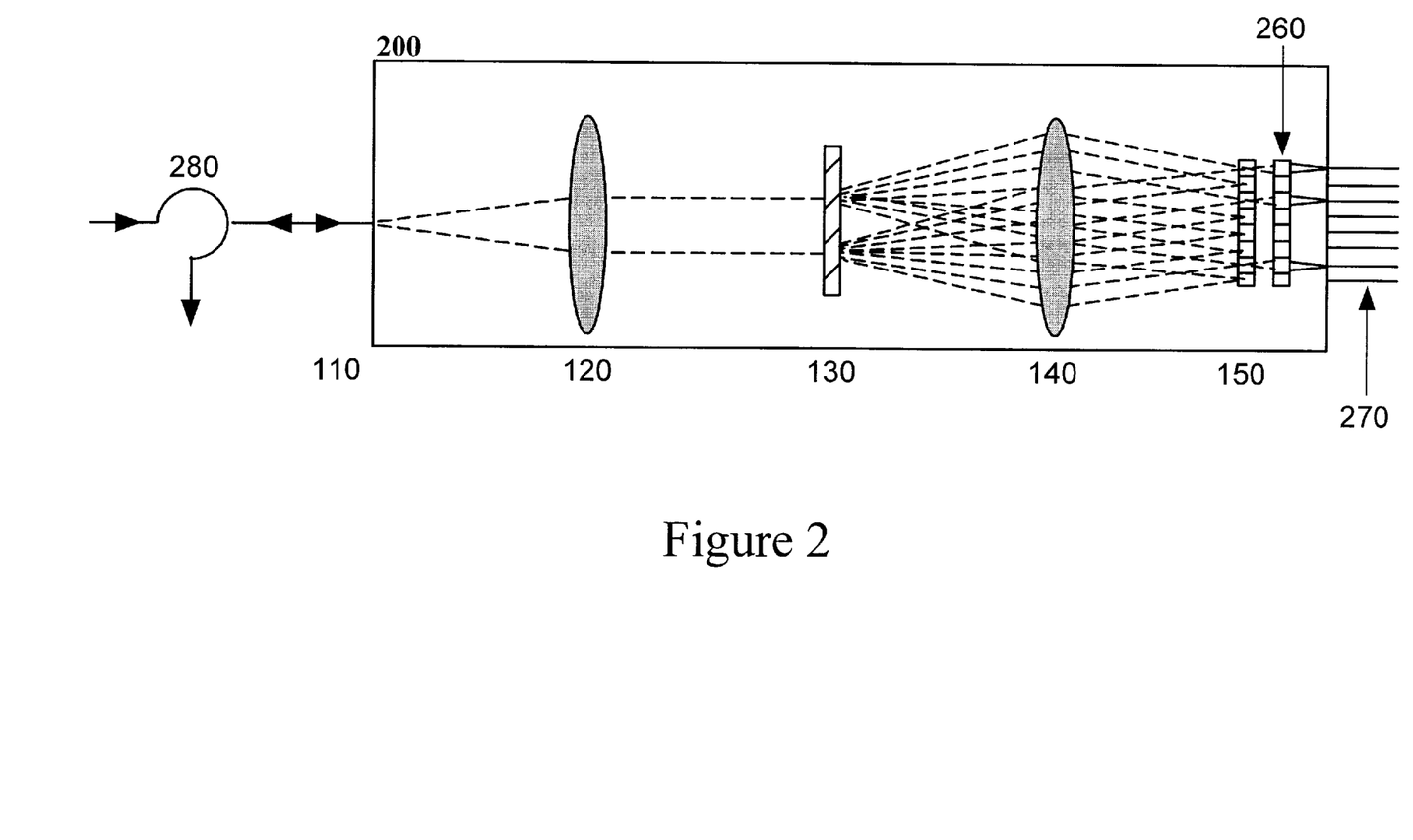
FIG. 2 shows as an exemplary embodiment of the invention an optical add/drop multiplexer (OADM) allowing frequency separation onto individual fiber optic transmission lines, or the reverse.
Figure 3:
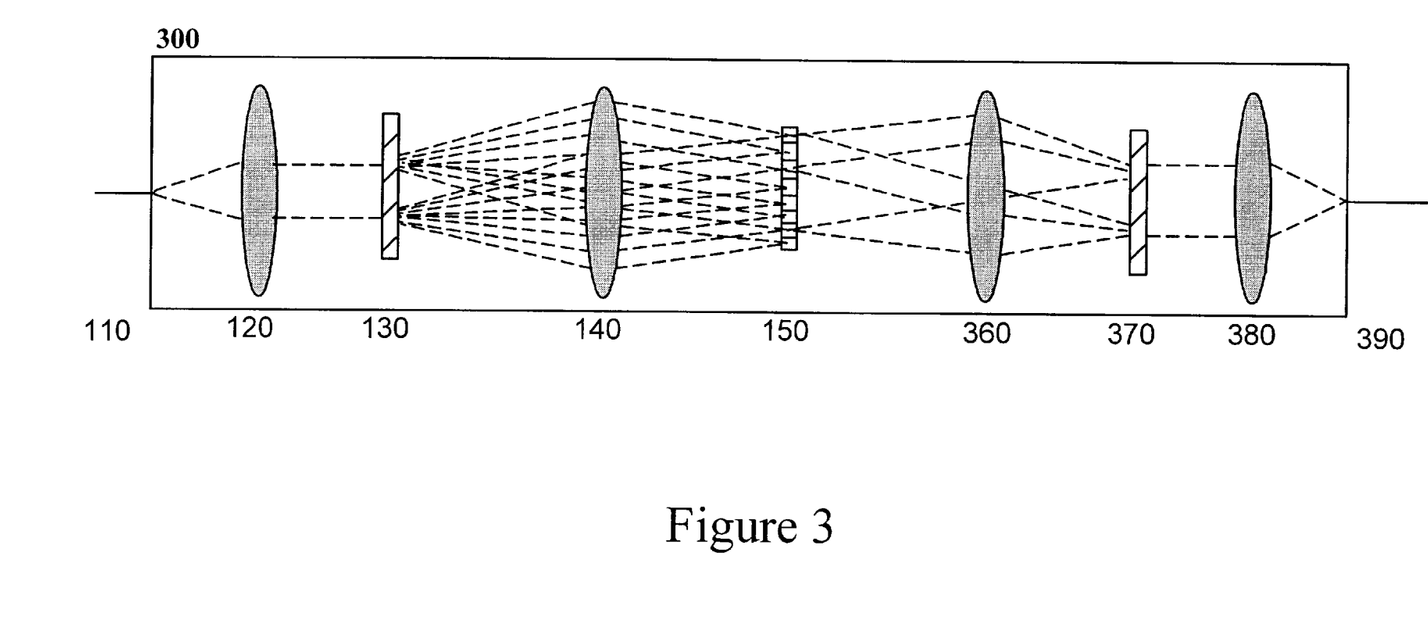
FIG. 3 shows as an exemplary alternative embodiment of the invention another optical add/drop multiplexer (OADM) allowing frequency addition and separation using a single distinct input and output fiber optic line.

FIGS. 2 and 3 show two separate embodiments of an optical add/drop multiplexer (OADM) produced using the basic optical bench component shown in FIG. 1. In one embodiment 200, depicted in FIG. 2, a lens structure 260 has been inserted after the SLM 150 to launch the transmitted wavelengths from the SLM 150 into an array of fiber optics 270. A fiber positioned within the array corresponds to a specific frequency within the ITU grid. This optical structure allows all of the wavelengths or a subset of wavelengths to be de-multiplexed from a single optical fiber onto the array of fibers. The addition of an optical circulator 280 prior to the OADM depicted in FIG. 2 allows the reflected frequencies to remain on the original fiber transmission line. The OADM shown in FIG. 2 may also be operated in reverse, multiplexing the wavelengths on the array of fiber optics 270 onto a single fiber optic output line 110.

FIG. 3 shows an alternative embodiment 300 of the OADM, which allows a subset of wavelengths to be de-multiplexed from a single optical fiber onto another single optical fiber. This is accomplished by providing symmetric optical components on each side of the SLM 150, by the addition of another DOE 370, another focusing lens 360 and another fiber launch lens 380 assembly. In other embodiments, the addition of optical circulators on either or both ends of the structure allows a number of functions consistent with OADMs. In another embodiment, this structure may also be used as an EDFA gain-flattening filter. Each of the ITU frequency intensities can be individually controlled using the micro FPIA elements. This transmissive rather than reflective filter structure eliminates the need for a fiber circulator on the front end of the primary optical bench component, reducing the cost of the function and the insertion loss associated with the addition of an optical circulator. Once again the light may propagate from left to right or right to left.

Figure 4:
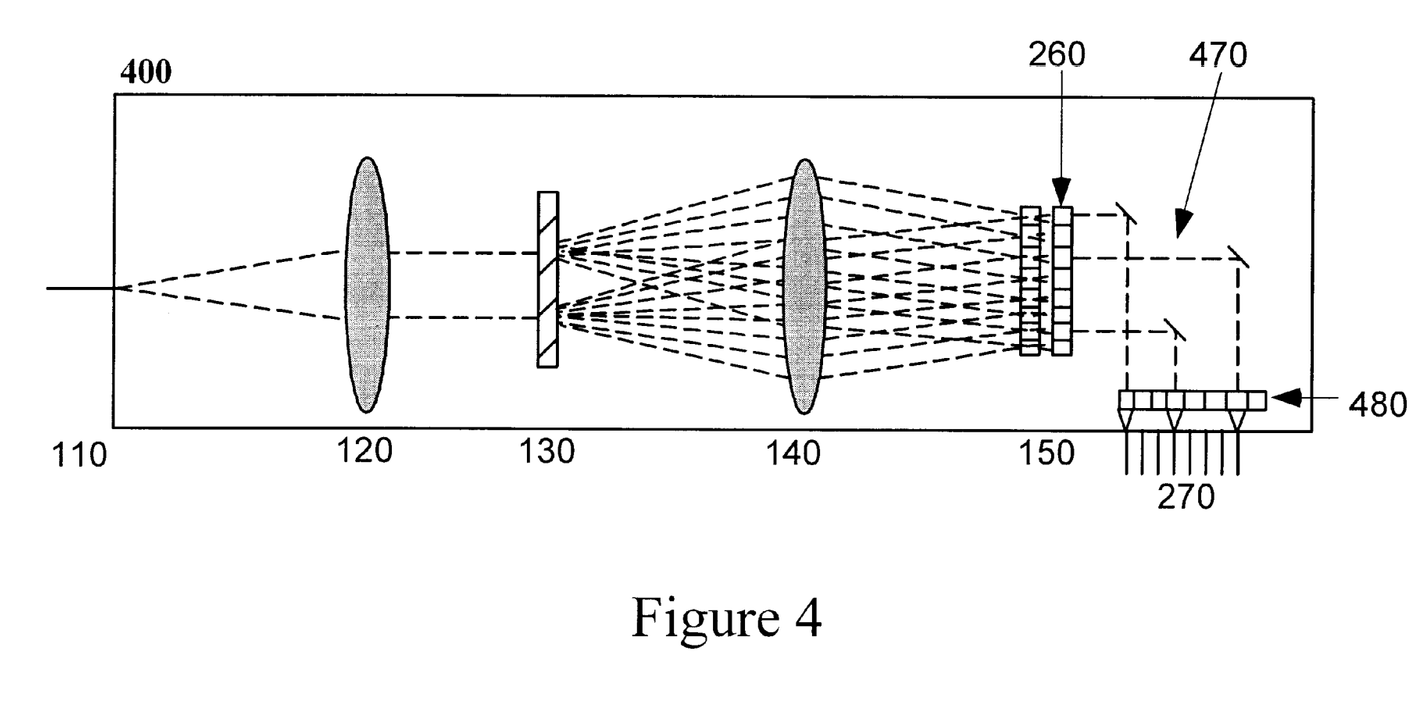
FIG. 4 shows as an exemplary embodiment of the invention a Dense Wavelength Division Multiplexing (DWDM) router allowing frequency multiplexing and dynamic routing within a single optical platform.

FIG. 4 shows an embodiment of a DWDM router which can be produced using the optical structure shown in FIG. 2 combined with an additional 2-D pop-up mirror array 470. A 2-D array 470 of MEMS mirrors allows transparent 2-D laser beam propagation (X,Y) by lifting a reflective mirror out of the third dimension (Z-axis). This combination enables a number of enhanced functions which are currently being provided by the serial combination of a number of discrete optical elements. FIG. 4 shows an embodiment 400 of the architecture. The primary structure acts as a gate to the 2-D switch, allowing selected grid frequencies to be added or dropped from the transmission line. Using this structure the ITU frequencies contained on a single fiber optic input will be separated and directed along a number of individual beam paths. The individual beams are input into a switching structure, which allows any of the M input frequencies to be coupled into any of the N output optical fibers. As previously described, any of the incoming frequencies may also be directed to remain on the original transmission fiber.

There are currently no integrated optical components, which provide this level of functionality. The integrated approach of the present invention provides the combined functionality at significant cost savings in components, controls, reduced optical losses, temperature sensitivity, size and complexity.

An embodiment of another product using the primary bench structure is a digitally tuned, single frequency tunable diode laser transmitter. The primary optical bench input fiber optic is replaced by a semiconductor diode laser chip, providing an active gain medium, which can be rapidly switched from one ITU grid frequency to another. The selective filtering and feedback functionality of the primary bench enables a digitally tunable external cavity diode laser. The advantages of this product include dynamic wavelength allocation, reduced investment in primary component purchases and backup systems. One expects that the long-term stability of this structure will exceed that achieved by distributed Bragg reflector (DBR) and grating-assisted codirectional coupler with rear sampled reflector (GCSR) laser sources. The structure of the embodiment relies on geometric selection as opposed to calibration mapping between injection current and material index properties which may change with aging. The embodiment of the tunable laser using direct current injection does not require a separate pump laser, as do other products. Laser frequency control in this embodiment is provided by electronic control of the "digital mirror" array integrated into the laser cavity and allows complete coverage of the telecommunications spectral transmission band.

Another exemplary embodiment of the optical bench component is a tunable multifrequency diode laser source using the same optical structure. Two or more ITU grid frequencies are produced with dynamic power stabilization equalizing the multiple frequency power levels. The multiple output wavelengths may be transmitted on a single output fiber or by utilizing the functionality of the second product described above, the DWDM router. Each distinct wavelength of the digital external cavity diode laser (ECDL) output can be directed to a different optical fiber output for individual data encoding and subsequent transmission. Multi-frequency tunable sources hold the promise of significant cost reductions for telecommunication service providers by reducing the number of electronics/laser cards and backup cards required to implement the rapidly expanding DWDM optical systems. A multi-frequency source allows the replacement of two or three primary cards and an equivalent number of backup cards by a single primary card and a single backup unit. Tunable multi-frequency sources have a similar effect mainly in the backup systems (i.e., one backup system can replace many such backups). A multi-frequency tunable source can replace a number of backup cards, because it can provide the functionality of a number of different primary laser sources. This reduces the number of required backup cards and the cost associated with the hardware and testing of these cards.

The multi-frequency tunable laser transmitter will further reduce the required component investment, potentially having a substantial impact on the future optical networks providing fiber service to the business and the home. A single multi-frequency transmitter can provide hub services to a large number of clients.

Figure 5:
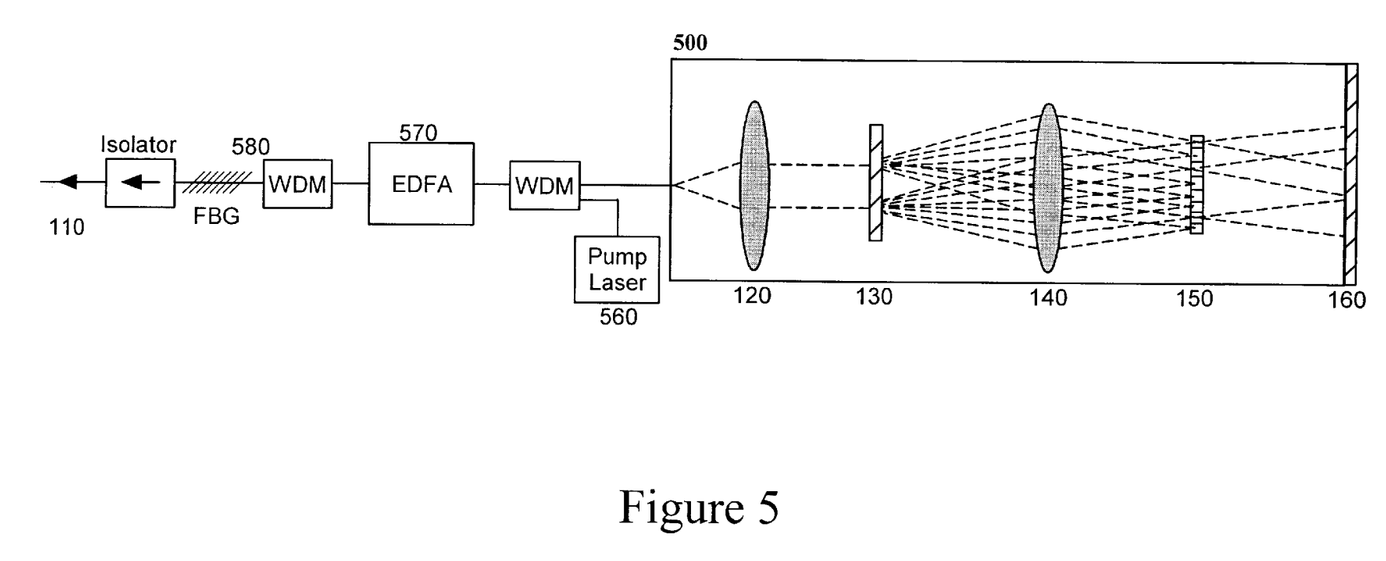
FIG. 5 shows as an exemplary embodiment of the invention a multi-frequency, tunable external cavity diode laser (ECDL) constructed using the basic optical bench component and additional commercial-off-the-shelf (COTS) products.

FIG. 5 shows an embodiment of a selective multifrequency laser amplifier 500 using the primary optical bench component of FIG. 1 integrated with commercial-off-the-shelf (COTS) components available within the telecommunications industry. A diode laser 560 pumps an erbium doped fiber amplifier (EDFA) 570. One end of the EDFA is connected to the primary optical element described above. The other end of the EDFA is connected to a broadband partially reflecting fiber Bragg grating (FBG) 580. The FBG 580 and the SLM 150 act as the two mirrors of a laser cavity surrounding the EDFA gain element 570. A number of specific SLM 150 elements are turned on (reflective) to produce a number of laser frequencies. The remaining frequencies within the EDFA gain bandwidth are transmitted through the SLM 150 and the laser gain collapses on the chosen frequencies. The use of a FPIA as the SLM element 150 allows active control of the relative intensities of the laser frequencies and improved spectral selection of the desired frequencies.

Figure 6:
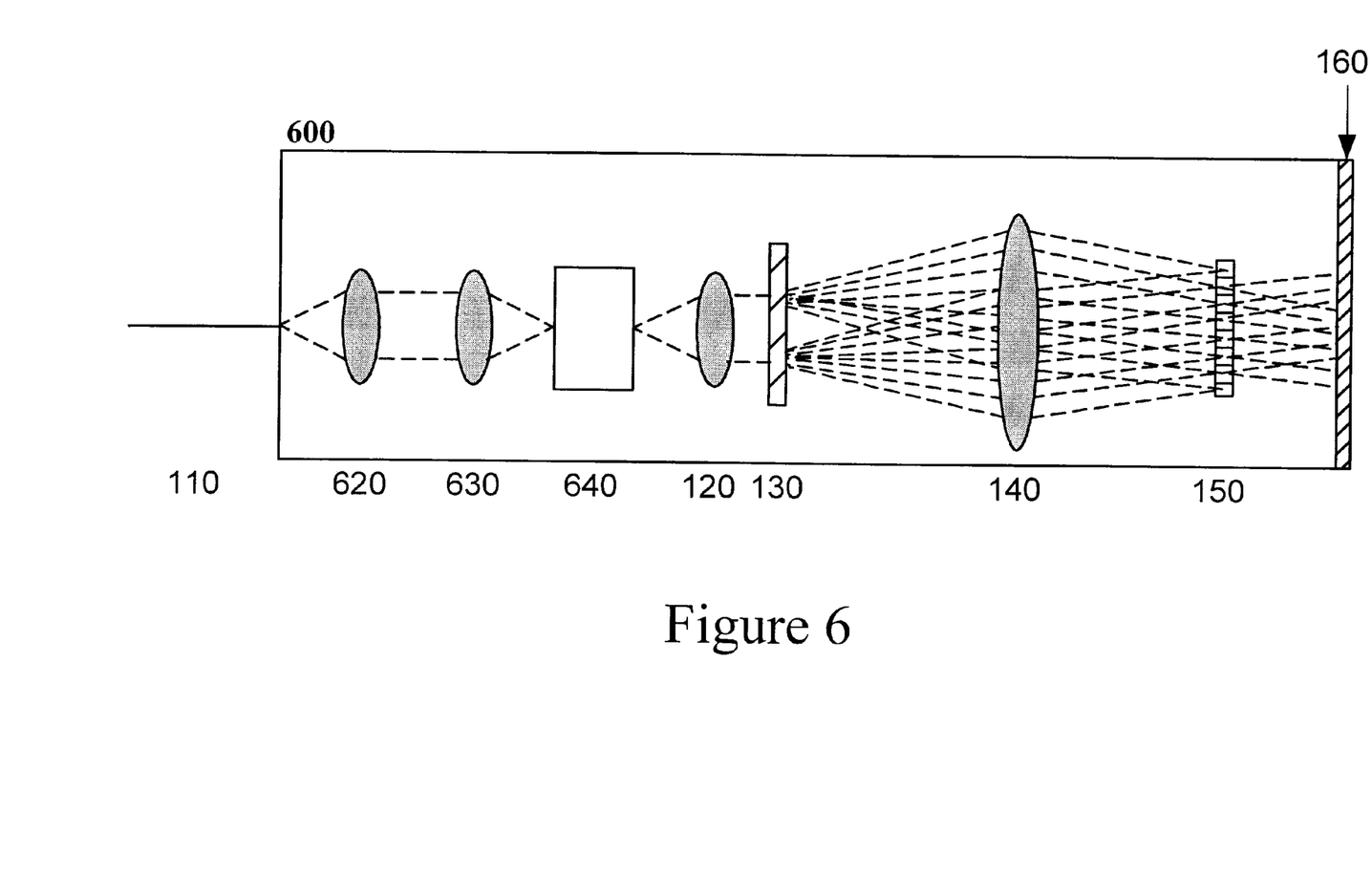
FIG. 6 shows as an exemplary embodiment of the invention an integrated multifrequency, tunable external cavity diode laser (ECDL) source.

The approach described above allows for rapid testing and prototyping of a multi-frequency, tunable ECDL source. In another embodiment 600, an integrated product places the active gain medium within the package of the primary optical bench component as shown in FIG. 6. In this schematic embodiment, a laser diode chip 640 (e.g., semiconductor optical amplifier, or SOA) is placed within the package, with lens assemblies 120, 630 on either side of the chip. The chip facet on the left side is coated with a partial reflector, while the right chip facet is anti-reflection (AR) coated. The output of the laser diode is collimated and transmitted through the DOE 130 to the SLM element 150. Once again selected frequencies are reflected with the laser cavity being formed by the SLM 150 (or FPIA) and the left side chip facet. The laser functionality is the same as that described above for FIG. 5. In this embodiment, the multi-frequency, tunable laser output is coupled into the output fiber optic via the left side lens assembly. An alternative output coupling embodiment uses partially reflective FPI array elements combined with a high efficiency (e.g., max-R) reflector on the back surface of the diode chip. A lens array focuses and a fiber array captures the multiple frequencies for subsequent data encoding. One of the primary advantages to this integrated approach is the elimination of external components (primarily the pump laser) and their expense. The integrated package also allows more precise environmental control and improved functionality.

In summary, the optical bench component provides an embodiment of a critical central component for a number of integrated optical telecommunication products not currently being offered. Each of these products is aimed at fulfilling a component need created by the rapid acceptance of DWDM. The structures leverage geometric wavelength selection with active gate "mirror arrays" and 2-D optical switch arrays. Significant component cost reduction may be realized using this building block approach, especially with the realization of MEMS designs and manufacturing techniques. These production techniques lend themselves to scalable manufacturing, resulting in pre-aligned optical structures with reduced thermal sensitivity. The integrated manufacturing approach will also enable efficient packaging and enhanced speed to market.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A monolithic optical apparatus, comprising
   a wavelength dispersive optical element receiving a substantially collimated input signal having multiple wavelengths and providing a wavelength dispersed output signal; and
   a spatial modulator element receiving said wavelength dispersed output signal and providing an output signal comprising at least a portion of each dispersed wavelength;
   wherein said wavelength dispersive optical element and said spatial modulator element are provided on a single substrate.

2. The monolithic optical apparatus of claim 1, wherein the wavelength dispersive optical element receives a substantially collimated input signal propagating in a first direction, and provides a first wavelength dispersed output signal and a second wavelength dispersed output signal; and wherein the spatial modulator element receives the first wavelength dispersed output signal and the second wavelength dispersed output signal and provides a transmitted output signal and a reflected signal; and the monolithic optical apparatus further comprising a collimating optical element that receives the reflected signal and provides a substantially collimated output signal propagating in a second direction substantially opposite to the first direction.

3. The monolithic optical apparatus of claim 2, wherein the wavelength dispersive optical element and the collimating optical element are the same optical structure viewed from opposite ends thereof.

4. The monolithic optical apparatus of claim 2, wherein one of the transmitted output signal and the reflected signal comprises a signal modulated to have substantially zero intensity.

5. The monolithic optical apparatus of claim 1, further comprising a second wavelength dispersive optical element receiving the output signal provided by the spatial modulator and providing a substantially collimated output signal.

6. The monolithic optical apparatus of claim 5, wherein the substantially collimated output signal is directed in substantially the same direction as that of the substantially collimated input signal.

7. The monolithic optical apparatus of claim 1, further comprising an absorbing surface that absorbs selected wavelengths from the spatial modulator output signal, the spatial modulator controlling the selection.

8. The monolithic optical apparatus of claim 7, wherein the spatial modulator dynamically controls which of the selected wavelengths from the wavelength dispersed output signal are to be absorbed.

9. The monolithic optical apparatus of claim 1, wherein the wavelength dispersive optical element receives a substantially collimated input signal propagating in a first direction; and the wavelength dispersive optical element receives the output signal provided by the spatial modulator and provides a substantially collimated output signal propagating in a second direction.

10. The monolithic optical apparatus of claim 9, wherein the second direction of propagation is substantially opposite to the first direction of propagation.

11. The monolithic optical apparatus of claim 1, further comprising a variable reflection filter to select wavelengths from the wavelength dispersed output signal to be reflected.

12. The monolithic optical apparatus of claim 1, further comprising a variable transmission filter to select wavelengths from the wavelength dispersed output signal to be transmitted.

13. A microelectromechanical optical apparatus, comprising a wavelength dispersive optical element receiving a substantially collimated input signal having multiple wavelengths and providing a wavelength dispersed output signal; and a spatial modulator element receiving said wavelength dispersed output signal and providing an output signal comprising at least a portion of each dispersed wavelength.

14. The microelectromechanical optical apparatus of claim 13, wherein said wavelength dispersive optical element and said spatial modulator element are collocated on a single substrate.

15. The microelectromechanical optical apparatus of claim 14, wherein said single substrate comprises a polycrystalline material.

16. The microelectromechanical optical apparatus of claim 14, wherein said single substrate comprises a single crystal.

17. The microelectromechanical optical apparatus of claim 14, wherein said single substrate comprises a semiconductor single crystal.

18. The microelectromechanical optical apparatus of claim 13, further comprising a second wavelength dispersive optical element receiving the output signal provided by the spatial modulator and providing a substantially collimated output signal.

19. The microelectromechanical optical apparatus of claim 18, wherein the substantially collimated output signal is directed in substantially the same direction as that of the substantially collimated input signal.

20. The microelectromechanical optical apparatus of claim 13, further comprising an absorbing surface that absorbs selected wavelengths from the spatial modulator output signal, the spatial modulator controlling the selection.

21. The microelectromechanical optical apparatus of claim 20, wherein the spatial modulator dynamically controls which of the selected wavelengths from the wavelength dispersed output signal are to be absorbed.

22. The microelectromechanical optical apparatus of claim 13, further comprising a variable reflection filter to select wavelengths from the wavelength dispersed output signal to be reflected.

23. The microelectromechanical optical apparatus of claim 13, further comprising a variable transmission filter to select wavelengths from the wavelength dispersed output signal to be transmitted.

24. The microelectromechanical optical apparatus of claim 13, wherein the wavelength dispersive optical element receives a substantially collimated input signal propagating in a first direction, and the wavelength dispersive optical element receives the output signal provided by the spatial modulator and provides a substantially collimated output signal propagating in a second direction.

25. The microelectromechanical optical apparatus of claim 24, wherein the second direction of propagation is substantially opposite to the first direction of propagation.

26. The microelectromechanical optical apparatus of claim 13, wherein the wavelength dispersive optical element receives a substantially collimated input signal propagating in a first direction, and provides a first wavelength dispersed output signal and a second wavelength dispersed output signal; and wherein the spatial modulator element receives the first wavelength dispersed output signal and the second wavelength dispersed output signal and provides a transmitted output signal and a reflected signal; and the microelectromechanical optical apparatus further comprising a collimating optical element that receives the reflected signal and provides a substantially collimated output signal propagating in a second direction substantially opposite to the first direction.

27. The microelectromechanical optical apparatus of claim 26, wherein the wavelength dispersive optical element and the collimating optical element are the same optical structure viewed from opposite ends thereof.

28. The microelectromechanical optical apparatus of claim 26, wherein one of the transmitted output signal and the reflected signal comprises a signal modulated to have substantially zero intensity.

* * * * *